(12) United States Patent
Fan

(10) Patent No.: US 9,854,429 B2
(45) Date of Patent: Dec. 26, 2017

(54) MOBILE TERMINAL CONFIGURATION METHOD AND SYSTEM

(71) Applicant: ZTE CORPORATION, Shenzhen, Guangdong Province (CN)

(72) Inventor: Ruitao Fan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/030,872

(22) PCT Filed: Mar. 26, 2014

(86) PCT No.: PCT/CN2014/074101
§ 371 (c)(1),
(2) Date: Apr. 21, 2016

(87) PCT Pub. No.: WO2014/180194
PCT Pub. Date: Nov. 13, 2014

(65) Prior Publication Data
US 2016/0277919 A1     Sep. 22, 2016

(30) Foreign Application Priority Data

Oct. 22, 2013  (CN) .......................... 2013 1 0499987

(51) Int. Cl.
*H04M 3/00*     (2006.01)
*H04W 8/18*     (2009.01)
*H04W 8/24*     (2009.01)
*H04W 76/02*    (2009.01)
*H04W 8/20*     (2009.01)

(52) U.S. Cl.
CPC ........... *H04W 8/183* (2013.01); *H04W 8/245* (2013.01); *H04W 76/021* (2013.01); *H04W 8/20* (2013.01)

(58) Field of Classification Search
CPC ..... H04W 76/021; H04W 8/183; H04W 8/20; H04W 8/245
USPC .......................................... 455/418
See application file for complete search history.

(56) References Cited

U.S. PATENT DOCUMENTS

| | | | | |
|---|---|---|---|---|
| 2010/0287265 A1* | 11/2010 | Hu | .......................... | H04N 7/163 709/221 |
| 2011/0173685 A1* | 7/2011 | Chai | .................... | H04L 41/0806 726/6 |
| 2015/0106846 A1* | 4/2015 | Chen | .................. | H04N 21/6547 725/37 |

FOREIGN PATENT DOCUMENTS

| | | |
|---|---|---|
| CN | 101094472 A | 12/2007 |
| CN | 101237475 A | 8/2008 |
| CN | 101674569 A | 3/2010 |

* cited by examiner

*Primary Examiner* — Timothy Pham
(74) *Attorney, Agent, or Firm* — Ling Wu; Stephen Yang; Ling and Yang Intellectual Property

(57) ABSTRACT

A method for configuring a mobile terminal and system are provided. The method includes: a mobile terminal sending local information to a server, wherein the local information comprises MSID, MDN and NAI information and expected target customer brand information predefined by the mobile terminal; the mobile terminal acquiring configuration information sent by the server, wherein the configuration information is brand information in the server, which is matched with the local information sent by the mobile terminal; and the mobile terminal acquiring a configuration parameter corresponding to the brand information according to the brand information, and completing configuration according to the configuration parameter.

14 Claims, 3 Drawing Sheets

| Node | Host machine address OMADM parameter |
|---|---|
| ANIMATION | ./Customization/Animation |
| STARTUP_SOUND | ./Customization/StartupSound |
| DEFAULT_BACKGROUND | ./Customization/DefaultBackground |
| DEFAULT_RINGER | ./Customization/DefaultRinger |
| ANDROID_CLIENT_MARKET | ./Customization/Android/ClientID/AndroidMarket |
| ANDROID_CLIENT_MOBILE_SEARCH | ./Customization/Android/ClientID/MobileSearch |
| YOUTUBE ANDROID_CLIENT_YOUTUBE | ./Customization/Android/ClientID/Youtube |
| ANDROID_OPERATOR_NETWORK_CODE | ./Customization/Android/OperatorID/NetworkCode |
| CALL_INTERCEPT_FIRST | ./Customization/CallIntercept/First |
| ADC_FIRST | ./Customization/ADC/First |
| ROAM_PREF_MENU_DISPLAY | ./Customization/RoamPreference/MenuDisplay |
| ROAM_PREF_HOME_ONLY | ./Customization/RoamPreference/HomeOnly |
| BROWSER_HOME_PAGE | ./Customization/Browser/Homepage |
| BROWSER_SEARCH_ENGINE | ./Customization/Browser/SearchEngine |
| BROWSER_UA_PROF_URL | ./Customization/Browser/UAProfURL |
| ENABLED_APPS_VVM | ./Customization/EnabledApps/VVM |
| WIFI_SSID | ./Customization/Wifi/SSID |
| WIFI_MAX_USERS | ./Customization/Wifi/MaxUsers |
| WIFI_GSM_MAX_USERS | ./Customization/Wifi/GSMMaxUsers |
| WIFI_DOM_ROAM_MAX_USERS | ./Customization/Wifi/DomRoamMaxUsers |
| WIFI_INT_ROAM_MAX_USERS | ./Customization/Wifi/IntRoamMaxUsers |
| URL_MMS_SERVER_URL | ./Customization/MMS/ServerUrl |
| MMS_PROXY | ./Customization/MMS/Proxy |
| CONTACTS_FIRST | ./Customization/Contacts/First |

| Node | Host machine address OMADM parameter |
|---|---|
| ANIMATION | ./Customization/Animation |
| STARTUP_SOUND | ./Customization/StartupSound |
| DEFAULT_BACKGROUND | ./Customization/DefaultBackground |
| DEFAULT_RINGER | ./Customization/DefaultRinger |
| ANDROID_CLIENT_MARKET | ./Customization/Android/ClientID/AndroidMarket |
| ANDROID_CLIENT_MOBILE_SEARCH | ./Customization/Android/ClientID/MobileSearch |
| YOUTUBE ANDROID_CLIENT_YOUTUBE | ./Customization/Android/ClientID/Youtube |
| ANDROID_OPERATOR_NETWORK_CODE | ./Customization/Android/OperatorID/NetworkCode |
| CALL_INTERCEPT_FIRST | ./Customization/CallIntercept/First |
| ADC_FIRST | ./Customization/ADC/First |
| ROAM_PREF_MENU_DISPLAY | ./Customization/RoamPreference/MenuDisplay |
| ROAM_PREF_HOME_ONLY | ./Customization/RoamPreference/HomeOnly |
| BROWSER_HOME_PAGE | ./Customization/Browser/Homepage |
| BROWSER_SEARCH_ENGINE | ./Customization/Browser/SearchEngine |
| BROWSER_UA_PROF_URL | ./Customization/Browser/UAProfURL |
| ENABLED_APPS_VVM | ./Customization/EnabledApps/VVM |
| WIFI_SSID | ./Customization/Wifi/SSID |
| WIFI_MAX_USERS | ./Customization/Wifi/MaxUsers |
| WIFI_GSM_MAX_USERS | ./Customization/Wifi/GSMMaxUsers |
| WIFI_DOM_ROAM_MAX_USERS | ./Customization/Wifi/DomRoamMaxUsers |
| WIFI_INT_ROAM_MAX_USERS | ./Customization/Wifi/IntRoamMaxUsers |
| URL MMS_SERVER_URL | ./Customization/MMS/ServerUrl |
| MMS_PROXY | ./Customization/MMS/Proxy |
| CONTACTS_FIRST | ./Customization/Contacts/First |

FIG. 1

MOBILE TERMINAL CONFIGURATION METHOD AND SYSTEM

TECHNICAL FIELD

The present document relates to the field of mobile communication, and in particular to a method for configuring a mobile terminal and system.

BACKGROUND OF THE RELATED ART

The dynamic configuration of a mobile terminal is easy to reduce the models and improve the efficiency of product promotion, to meet different market requirements and maximize the economic benefit of the single product, which are always the functions pursued by the mobile terminal manufacturers and the operators.

The existing schemes are basically to perform the simple interface style adaption based on ordinary customers, or parameter adaptation of a single function, which can not meet a large scale of model configuration and functional level configuration requirements of the mobile terminal manufacturers and operators.

SUMMARY OF THE INVENTION

The embodiment of the present invention provides a method for configuring a mobile terminal and system, which realizes the problem that the related configuration scheme cannot satisfy the requirement of the operator.

The embodiment of the present invention provides a method for configuring a mobile terminal, comprising:

a mobile terminal sending local information to a server, wherein the local information comprises mobile station identifier (MSID), mobile directory number (MDN) and network access identifier (NAI) information and expected target customer brand information predefined by the mobile terminal;

the mobile terminal acquiring configuration information or indication information sent by the server, wherein the configuration information is brand information in the server, which is matched with the local information sent by the mobile terminal; and the mobile terminal acquiring a configuration parameter corresponding to the brand information according to the brand information, and completing configuration according to the configuration parameter.

Alternatively, the indication information is information indicating a brand;

the method further comprises:

presetting multiple groups of configuration parameters of different brands in the mobile terminal, wherein, each group of configuration parameter is corresponding to a unique brand.

Alternatively, the mobile terminal acquiring a configuration parameter corresponding to the brand information according to the brand information, and completing configuration according to the configuration parameter comprises:

the mobile terminal judging whether the brand information is target customer brand information; and when the brand information is the target customer brand information, the mobile terminal analyzing the brand information, and rewriting a configuration file according to analyzed brand information.

Alternatively, the method further comprises: after the mobile terminal judges whether the brand information is the target customer brand information, the mobile terminal judging whether a mandatory update is required when the brand information is not the target customer brand information;

the mobile terminal modifying the target customer brand information of the mobile terminal according to the brand information when the mobile terminal determines that a mandatory update is required; and the mobile terminal analyzing the brand information, and rewriting the configuration file according to the analyzed brand information.

Alternatively, the mobile terminal analyzing the brand information, and rewriting the configuration file according to the analyzed brand information comprises:

the mobile terminal analyzing the brand information, selecting a configuration file corresponding to the brand information from multiple groups of configuration files of different brands which are preset locally, and completing the configuration according to the configuration file.

Alternatively, the mobile terminal analyzing the brand information, and rewriting the configuration file according to the analyzed brand information comprises:

the mobile terminal analyzing the brand information and acquiring path information, in the server, of the configuration file corresponding to the brand information; and the mobile terminal downloading the configuration file from the server through an air interface according to the path information and completing the configuration according to the configuration file.

Alternatively, the mobile terminal acquires the configuration information sent by the server comprises:

the mobile terminal acquiring configuration information sent by the server through the air interface.

Alternatively, the method further comprises:

the mobile terminal receiving the brand information and mandatory update bit information sent by the server through the air interface or a product modification tool (PST tool) or an engineering instruction, wherein, the mandatory update bit information indicates the mobile terminal to update the target customer brand information to the brand information.

Alternatively, the method further comprises:

the mobile terminal receiving an engineering instruction indicating to delete an operator flag bit, deleting the operator flag bit according to the engineering instruction and executing a restoring factory operation, to restore the mobile terminal to a factory default state.

Alternatively, the method further comprises:

after the mobile terminal executes the restoring factory operation, the mobile terminal being restored to a configuration state after last air interface download.

The embodiment of the present invention further provides a method for configuring a mobile terminal, comprising:

a server receiving local information of a mobile terminal sent by the mobile terminal, wherein the local information comprises mobile station identifier (MSID), mobile directory number (MDN) and network access identifier (NAI) information and expected target customer brand information predefined by the mobile terminal;

the server generating configuration information of the mobile terminal, wherein the configuration information is brand information in the server, which is matched with the local information sent by the mobile terminal; and the server sending the configuration information to the mobile terminal.

Alternatively, the server generates the configuration information of the mobile terminal comprises:

the server judging whether target customer brand information required by the mobile terminal is matched with database information, wherein the database information is a group of brand information which is preset in the server; and when a judgment result is that the target customer brand information required by the mobile terminal is matched with the database information, the server acquiring brand information matched with the target customer brand information and generating the configuration information according to the brand information.

Alternatively, the method further comprises: after the server judges whether target customer brand information required by the mobile terminal is matched with database information, the server modifying the target customer brand information of the mobile terminal when the judgment result is that the target customer brand information required by the mobile terminal is not matched with the database information.

Alternatively, the server sending the configuration information to the mobile terminal comprises:

the server sending the configuration information to the mobile terminal through an air interface.

Alternatively, the method further comprises: after the server sends the configuration information to the mobile terminal, the server receiving a request of the mobile terminal, wherein path information of a configuration file is carried in the request; and the server acquiring the configuration file according to the path information, and sending the configuration file through the air interface to the mobile terminal.

Alternatively, the method further comprises:

the server sending the brand information and mandatory update bit information through the air interface or a product modification tool (PST tool) or an engineering instruction, wherein the mandatory update bit information indicates the mobile terminal to update the target customer brand information to the brand information.

The embodiment of the present invention further provides a system for configuring a mobile terminal, comprising: a mobile terminal and a server; wherein, the mobile terminal is configured to: send local information to the server, wherein the local information comprises mobile station identifier (MSID), mobile directory number (MDN) and network access identifier (NAI) information and expected target customer brand information predefined by the mobile terminal; acquire configuration information sent by the server, wherein the configuration information is brand information in the server, which is matched with the local information sent by the mobile terminal; then acquire a configuration file corresponding to the brand information according to the brand information, and complete configuration according to the configuration file; and the server is configured to: receive local information of the mobile terminal sent by the mobile terminal, generate the configuration information of the mobile terminal, and send the configuration information to the mobile terminal.

In the technical scheme of the embodiment of the present invention, it realizes the mobile terminal configuration mechanism which can be dynamically adapted and solves the problem that the related configuration scheme cannot satisfy the requirement of the operator.

BRIEF DESCRIPTION OF DRAWINGS

FIG. 1 is a schematic diagram of a configuration parameter in a method for configuring a mobile terminal provided by embodiment one of the present invention;

PREFERRED EMBODIMENTS OF THE PRESENT INVENTION

The existing schemes are basically to perform the simple interface style adaption based on ordinary customers, or parameter adaptation of a single function, which cannot meet a large scale of model configuration and functional level configuration requirements of the mobile terminal manufacturers and operators.

The embodiment of the present invention provides a method for configuring a mobile terminal and system. The embodiments of the present invention are described in detail with reference to the accompanying drawings hereinafter. It should be illustrated that, in the case of not conflicting, the embodiments in the present application and features in these embodiments can be combined with each other.

The embodiment one of the present invention is described with reference to the accompanying drawings hereinafter.

The embodiments of the present invention provide a method for configuring a mobile terminal. In that method, the server generates indication information containing information indicating the brand and sends to the mobile terminal through an air interface, and the mobile terminal determines the brand according to the information indicating the brand and acquires a configuration file corresponding to the brand (the configuration file contains a plurality of configuration parameters). FIG. 1 is a group of instance diagrams of the configuration parameters, including the startup animation, the startup ringtone, the default wallpaper, the default ringtone, the roaming control, the wireless fidelity (WiFi), the predefined telephone book, the number service, the legal statement, the MMS setting, the SMS setting and third-party application configuration. More configuration items can be extended according to the requirement.

Figure 2:
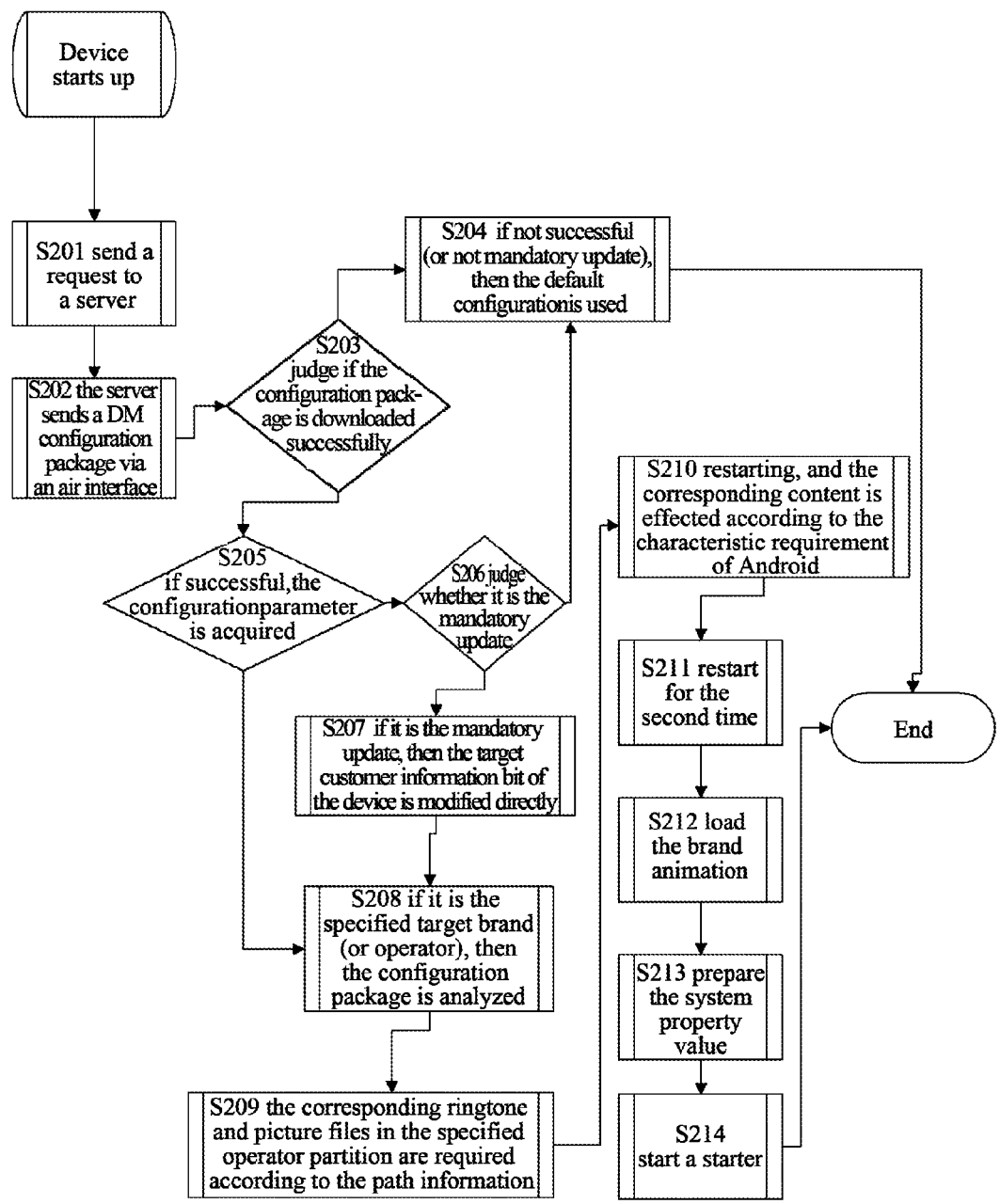
FIG. 2 is a flow chart of a method for configuring a mobile terminal provided by embodiment one of the present invention.

FIG. 2 is a flow chart of completing configuration of an air interface of assigned brand by using the terminal configuration method provided by the embodiment of the present invention, and the process includes the following steps:

in step 201, a mobile terminal is starting up for the first time, and it sends local information to a server, wherein the local information comprises MSID, MDN and NAI information and expected target customer brand information predefined by the mobile terminal.

In step 202, the server receives the local information of the mobile terminal sent by the mobile terminal, and generates the configuration information of the mobile terminal. The server judges whether the target customer brand information required by the mobile terminal is matched with database information (the database information is a group of brand information preset in the operator server) according to a network code and brand initials. When a judgment result shows matching, the server acquires brand information matched with the target customer brand information and generates a configuration package (that is, the configuration information) according to the brand information. If the judgment result shows not matching, then it is judged whether there is a need to amend the brand request; if necessary, the Open Mobile Alliance device management (OMADM) technology is used to modify the target customer brand information of the mobile terminal at first, and then the configuration package is pushed to the mobile terminal, wherein the brand information consistent with the modified target customer brand information is carried in the configuration package.

Alternatively, the configuration package can contain all configuration parameters in FIG. 1, or part of the configuration parameters in FIG. 1.

In step 203, the mobile terminal acquires the configuration information sent by the server. The mobile terminal judges whether the configuration package is downloaded successfully; if successful, then step 205 is entered; if not successful, then step 204 is entered.

In step 204, if the configuration package is not downloaded successfully, then the default configuration information is maintained, exiting from the process.

In step 205, if the configuration package is downloaded successfully, the mobile terminal acquires a configuration parameter corresponding to the brand information according to the brand information, and completes the configuration according to the configuration parameter. The mobile terminal judges whether the brand information carried in the configuration package is the required target customer brand information. If yes, then the brand information in the configuration package is analyzed, to acquire the configuration file or path information of the configuration file, and step 208 is entered; if not, step 206 is entered.

In step 206, it is judged whether it is a mandatory update. When the judgment result is yes, step 207 is entered; and when the judgment result is no, step 204 is entered.

In step 207, if the judgment result in step 206 is to be identified as being able to perform a mandatory update, then the OMADM technology is used to modify the target customer brand information of the mobile terminal firstly; if it is identified as being unable to perform a mandatory update, then the default configuration information is maintained, exiting from the process.

In step 208, if it is the required target brand, then the configuration package is analyzed, and the configuration file of the mobile terminal is rewritten according to the analyzed brand information.

In step 209, according to the path information of the configuration file, a brand folder is specified in the customer partition to acquire the picture and ringtone resources of the corresponding brand.

In step 210, the mobile terminal is automatically restarted, and the restarting request is to enable the following Android dedicated content to be effect:

1, Client ID—Android Market
2, Client ID—Mobile Search
3, Client ID—Youtube
4, Operator ID—Name
5, Operator ID—Network Code.

In step 211, the mobile terminal is restarted for the second time.

In step 212, the restarting at this time loads the contents, such as the startup animation, the ringtone, etc., of the specified brand. In that step, the starting of the specified brand has already been completed.

In step 213, the system property value is prepared, and the configuration information of the specified brand has already been collected in that step.

In step 214, the starter of the specified brand is started, and the configuration of interface layout is performed. The starting of the Android brand customer is completed, and the mobile terminal configuration is completed.

The embodiment two of the present invention is described with reference to the accompanying drawings hereinafter.

Figure 3:
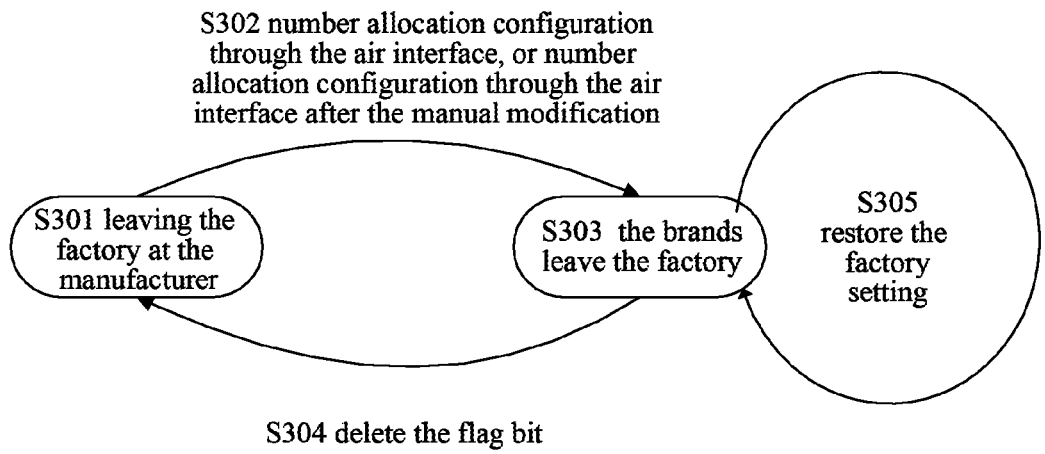
FIG. 3 is a flow chart of a method for configuring a mobile terminal provided by embodiment two of the present invention.

FIG. 3 illustrates the procedure on how to switch among different brand users, including the following steps:

in step 301, the mobile terminal of the manufacturer is in the factory default state.

After the mobile terminal leaves the factory, it can be switched among different brands, for example, executing step 302 and step 303.

In step 302, according to the procedure as shown in FIG. 2, the server can perform the brand configuration through the air interface. Or it modifies the target customer brand information of the mobile terminal and the mandatory update bit information by using a product modification tool (PST tool) or an engineering instruction, and then it performs the configuration through the air interface.

In step 303, it becomes the software of the assigned brand after the allocation of numbers.

In step 304, when it is required to restore to the full factory setting state, the operator flag bit can be deleted manually on the mobile terminal through the engineering instruction, then the restoring factory operation is executed, that is, it is restored to the factory default state of the mobile terminal of the manufacturers.

In step 305, if the operator flag bit is not deleted, then it is restored to the configuration state after the air interface download when the restoring factory operation is executed on the mobile terminal.

Considering the load and traffic of air interface, multiple groups of configuration parameters of different brands can be deployed in advance to the mobile terminal.

Considering the configuration flexibility, the multiple groups of configuration parameters of different brands can be stored in the server side, which is easy to adapt to more brands, or operators.

The embodiment three of the present invention is described with reference to the accompanying drawings hereinafter.

Figure 4:
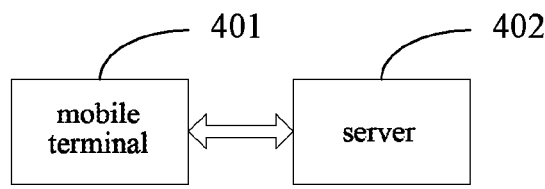
FIG. 4 is a structure schematic diagram of a system for configuring a mobile terminal provided by embodiment three of the present invention.

The embodiment of the invention provides a system for configuring a mobile terminal. The structure of the system is shown in FIG. 4, including: a mobile terminal 401 and server 402; wherein, the mobile terminal 401 is configured to: send local information to the server 402, wherein the local information includes mobile station identifier (MSID), mobile directory number (MDN) and network access identifier (NAI) information and expected target customer brand information predefined by the mobile terminal; acquire configuration information sent by the server 402, wherein the configuration information is brand information in the server 402, which is matched with the local information sent by the mobile terminal 401; then acquire a configuration file corresponding to the brand information according to the brand information, and complete configuration according to the configuration file; and the server 402 is configured to: receive local information of the mobile terminal 401 sent by the mobile terminal 401, generate the configuration information of the mobile terminal 401, and send the configuration information to the mobile terminal 401.

The system for configuring a mobile terminal provided by the embodiment of the present invention can be combined with the method for configuring a mobile terminal provided by the embodiment of the present invention. In the present embodiment, the mobile terminal sends local information to a server, and the server receives the local information of the mobile terminal sent by the mobile terminal, generates the configuration information of the mobile terminal and sends the configuration information to the mobile terminal; the mobile terminal acquires the configuration information sent by the server, and acquires the configuration file corresponding to the brand information according to the brand information in the configuration information, and completes the configuration according to the configuration file. It realizes the mobile terminal configuration mechanism which can be dynamically adapted, and solves the problem that the related configuration scheme cannot satisfy the requirement of the operator.

It can be understood by those skilled in the art that all or part of steps in the above-mentioned embodiment can be fulfilled by the computer program flow, and the computer program flow can be stored in a computer readable storage medium, and the computer program flow is executed on the corresponding hardware platform (such as a system, a mobile terminal, an apparatus, a component, etc.), and includes one of the steps of the method embodiment or its combination when being executed.

Alternatively, all or part of the steps in the above-mentioned embodiments also can be implemented by the integrated circuits. Those steps can be made into integrated circuit modules one after another respectively, or multiple modules or steps therein are made into a single integrated circuit module for implementation. In this way, the present document is not limited to any specific combination of the hardware and software.

Each device/function module/function unit in the above-mentioned embodiment can be implemented by the universal calculating apparatus, and they can be integrated in a single calculating apparatus, or distributed in the network made up of a plurality of calculating apparatuses.

Each device/function module/function unit in the above-mentioned embodiment can be stored in a computer readable storage medium when it is implemented in the form of the software function module and it is sold or used as an individual product. The above-mentioned computer readable storage medium can be a read only memory, a magnetic disk or an optical disk, etc.

Those modifications and replacements which can be thought out easily by those skilled in the art in the technical scope disclosed by the present document should be embodied in the protection scope of the present document. Therefore, the protection scope of the present document should be subject to the protection scope described by the claims.

INDUSTRIAL APPLICABILITY

In the technical scheme of the embodiment of the present invention, it realizes the mobile terminal configuration mechanism which can be dynamically adapted, and solves the problem that the related configuration scheme cannot satisfy the requirement of the operator.

What we claim is:

1. A method for configuring a mobile terminal, comprising:
   a mobile terminal sending local information to a server, wherein the local information comprises mobile station identifier (MSID), mobile directory number (MDN) and network access identifier (NAI) information and expected target customer brand information predefined by the mobile terminal;
   the mobile terminal acquiring configuration information or indication information sent by the server, wherein the configuration information is brand information in the server, which is matched with the local information sent by the mobile terminal; and
   the mobile terminal acquiring a configuration parameter corresponding to the brand information according to the brand information, and completing configuration according to the configuration parameter; wherein the indication information is information indicating a brand;
   the method further comprises:
   presetting multiple groups of configuration parameters of different brands in the mobile terminal, wherein, each group of configuration parameter is corresponding to a unique brand; wherein the mobile terminal acquiring a configuration parameter corresponding to the brand information according to the brand information and completing configuration according to the configuration parameter comprises:
   the mobile terminal judging whether the brand information is the target customer brand information; and
   when the brand information is the target customer brand information, the mobile terminal analyzing the brand information, and rewriting a configuration file according to analyzed brand information.

2. The method according to claim 1, further comprising: after the mobile terminal judges whether the brand information is the target customer brand information,
   the mobile terminal judging whether a mandatory update is required when the brand information is not the target customer brand information;
   the mobile terminal modifying the target customer brand information of the mobile terminal according to the brand information when the mobile terminal determines that a mandatory update is required; and
   the mobile terminal analyzing the brand information, and rewriting the configuration file according to the analyzed brand information.

3. The method according to claim 2, wherein the mobile terminal analyzing the brand information and rewriting the configuration file according to the analyzed brand information comprises:
   the mobile terminal analyzing the brand information, selecting a configuration file corresponding to the brand information from multiple groups of configuration files of different brands which are preset locally, and completing the configuration according to the configuration file.

4. The method according to claim 2, wherein the mobile terminal analyzing the brand information and rewriting the configuration file according to the analyzed brand information comprises:
   the mobile terminal analyzing the brand information and acquiring path information, in the server, of the configuration file corresponding to the brand information; and
   the mobile terminal downloading the configuration file from the server through an air interface according to the path information and completing the configuration according to the configuration file.

5. The method according to claim 1, wherein, the mobile terminal acquiring the configuration information sent by the server comprises:
   the mobile terminal acquiring configuration information sent by the server through an air interface.

6. The method according to claim 1, further comprising:
   the mobile terminal receiving the brand information and mandatory update bit information sent by the server through an air interface or a product modification tool (PST tool) or an engineering instruction, wherein, the mandatory update bit information indicates the mobile terminal to update the target customer brand information to the brand information.

7. The method according to claim 1, further comprising:
the mobile terminal receiving an engineering instruction indicating to delete an operator flag bit, deleting the operator flag bit according to the engineering instruction and executing a restoring factory operation, to restore the mobile terminal to a factory default state.

8. The method according to claim 1, further comprising:
after the mobile terminal performs a restoring factory operation, the mobile terminal being restored to a configuration state after last air interface download.

9. A method for configuring a mobile terminal, comprising:
a server receiving local information of a mobile terminal sent by the mobile terminal, wherein the local information comprises mobile station identifier (MSID), mobile directory number (MDN) and network access identifier (NAI) information and expected target customer brand information predefined by the mobile terminal;
the server generating configuration information of the mobile terminal, wherein the configuration information is brand information in the server, which is matched with the local information sent by the mobile terminal; and
the server sending the configuration information to the mobile terminal, wherein the server generating configuration information of the mobile terminal comprises:
the server judging whether target customer brand information required by the mobile terminal is matched with database information, wherein the database information is a group of brand information which is preset in the server; and
when a judgment result is that the target customer brand information required by the mobile terminal is matched with the database information, the server acquiring brand information matched with the target customer brand information and generating the configuration information according to the brand information.

10. The method according to claim 9, further comprising:
after the server judges whether target customer brand information required by the mobile terminal is matched with database information,
the server modifying the target customer brand information of the mobile terminal when the judgment result is that the target customer brand information required by the mobile terminal is not matched with the database information.

11. The method according to claim 9, wherein the server sending the configuration information to the mobile terminal comprises:
the server sending the configuration information to the mobile terminal through an air interface.

12. The method according to claim 9, further comprising:
after the server sends the configuration information to the mobile terminal, the server receiving a request of the mobile terminal, wherein path information of a configuration file is carried in the request; and
the server acquiring the configuration file according to the path information, and sending the configuration file through an air interface to the mobile terminal.

13. The method according to claim 9, further comprising:
the server sending the brand information and mandatory update bit information through an air interface or a product modification tool (PST tool) or an engineering instruction, wherein the mandatory update bit information indicates the mobile terminal to update the target customer brand information to the brand information.

14. A system for configuring a mobile terminal, comprising: a mobile terminal and a server; wherein,
the mobile terminal is configured to: send local information to the server, wherein the local information comprises mobile station identifier (MSID), mobile directory number (MDN) and network access identifier (NAI) information and expected target customer brand information predefined by the mobile terminal; acquire configuration information sent by the server, wherein the configuration information is brand information in the server, which is matched with the local information sent by the mobile terminal; then acquire a configuration file corresponding to the brand information according to the brand information, and complete configuration according to the configuration file; and
the server is configured to: receive the local information of the mobile terminal sent by the mobile terminal, generate the configuration information of the mobile terminal, and send the configuration information to the mobile terminal; wherein the server generating configuration information of the mobile terminal comprises:
the server judging whether target customer brand information required by the mobile terminal is matched with database information, wherein the database information is a group of brand information which is preset in the server; and
when a judgment result is that the target customer brand information required by the mobile terminal is matched with the database information, the server acquiring brand information matched with the target customer brand information and generating the configuration information according to the brand information.

* * * * *